United States Patent [19]

Pyszczek et al.

[11] Patent Number: 5,468,569
[45] Date of Patent: Nov. 21, 1995

[54] USE OF STANDARD UNIFORM ELECTRODE COMPONENTS IN CELLS OF EITHER HIGH OR LOW SURFACE AREA DESIGN

[75] Inventors: Michael F. Pyszczek, LeRoy; Esther S. Takeuchi, East Amherst; Mark J. Kane, Buffalo, all of N.Y.

[73] Assignee: Wilson Greatbatch Ltd., Clarence, N.Y.

[21] Appl. No.: 213,629

[22] Filed: Mar. 15, 1994

[51] Int. Cl.$^6$ ............................ H01M 6/10; H01M 6/00
[52] U.S. Cl. ........................... 429/94; 429/128; 429/131; 29/623.5
[58] Field of Search ................ 29/623.1, 623.5; 429/94, 131, 136, 144, 209, 127, 128; 156/226, 227

[56] References Cited

U.S. PATENT DOCUMENTS

| | | | |
|---|---|---|---|
| 418,483 | 12/1899 | Woolf | 429/94 |
| 1,231,057 | 6/1917 | Palmer | 429/136 |
| 1,286,750 | 12/1918 | Palmer | 429/136 |
| 1,708,889 | 4/1929 | Levin | 29/623.1 |
| 3,663,721 | 5/1972 | Blondel et al. | 429/131 |
| 4,029,855 | 6/1977 | Dougherty et al. | 29/623.1 X |
| 4,051,304 | 9/1977 | Snook | 429/94 |
| 4,668,320 | 5/1987 | Crabtree | 156/192 |
| 4,761,352 | 8/1988 | Bakos | 429/94 |

*Primary Examiner*—Anthony Skapars
*Attorney, Agent, or Firm*—Hodgson, Russ, Andrews, Woods & Goodyear

[57] ABSTRACT

A method for manufacturing electrochemical cells having a low electrochemical surface, from standard electrodes used in cells having a high electrochemical surface, includes configuring the standard electrodes by folding one or more of the standard electrodes to reduce the overall length, and hence the electrochemical surface area to a fraction of that of the unfolded standard electrode. A cell stack is assembled by placing the folded electrode and a standard electrode, or alternatively a folded cathode and a folded anode, in a face-to-face relationship with a separator therebetween.

25 Claims, 5 Drawing Sheets

USE OF STANDARD UNIFORM ELECTRODE COMPONENTS IN CELLS OF EITHER HIGH OR LOW SURFACE AREA DESIGN

BACKGROUND OF THE INVENTION

This invention relates to a method of configuring standard uniform electrode components for making an electrode assembly suitable for an electrochemical cell of either a high or low electrochemical surface area.

In the manufacture of batteries, whether employing a primary (non-rechargeable) or secondary (rechargeable) electrochemical system, the uniformity of electrode geometries is critical in producing a cell which delivers consistent discharge performance, as well as producing a cell possessing a high degree of manufacturability. Because of this need, specialized equipment has been fabricated for the manufacturing process of producing electrodes of consistent geometry. However, the relative inflexibility in electrode geometries imparted by the use of specialized manufacturing processes may preclude the use of the resulting electrodes in cells for a wide variety of applications.

Depending on the battery type and its intended application, a number of electrodes are configured and assembled into a cell stack and then further manufactured into a finished cell. The assembly and configuration of the electrodes affects 1) the efficient use of space within a cell having a desired shape, which may be related to its particular application; 2) the amount of surface area of the electrode exposed to electrolytic action ("electrochemical surface area") thereby affecting the electrical performance of the finished cell; and 3) the cost of manufacturing the finished cell if different electrode geometries are desired, depending on the various cell types. For example, cells having lower electrochemical surface may be used in applications requiring a very long shelf-life or limitation of the cell's current and heat output. Cells having higher electrochemical surface may be used in applications requiring a high discharge and power capability. Thus, for each electrochemical surface area, a standard electrode geometry is produced using a separate specialized manufacturing process.

It would therefore be highly desirable to provide a method for the configuring of standard electrodes of uniform geometries in a fashion that provides for the production of electrochemical cells that specifically possess either a high or low electrochemical surface without appreciably increasing the cost of specialized manufacturing processes, or necessitating any substantial alterations in existing machinery involved in those processes, and yet maintaining a high degree of manufacturability.

SUMMARY OF THE INVENTION

It is a primary object of the present invention to provide a method for the configuring of standard electrodes of uniform geometries in a fashion that provides for the production of electrochemical cells that specifically possess either a high or low electrochemical surface.

It is another object of the present invention to provide an electrochemical cell and method of making the same without appreciably increasing the cost of specialized manufacturing processes.

It is a further object of this invention to provide such a cell and method without necessitating any substantial alterations in existing machinery involved in the manufacturing process, while at the same time the high degree of manufacturability, as well as performance and reliabilty standards, are maintained.

The present invention is not directed to the battery type per se, nor is the particular composition of the electrodes a primary focus of the method of this invention. Rather, the present invention provides a method for configuring standard electrodes of uniform geometries that can be used for cells either having a high or low electrochemical surface. As in standard practice, the electrodes comprising an anode and a cathode are placed on either side of a porous, electrically non-conductive separator material. The three component laminate is then configured into a cell stack of flat plate design which can be utilized in a prismatic style of cell, or wound in a jellyroll type design for use typically in cylindrical cells. These configurations would constitute a high surface area design. In accordance with the method of the present invention, in order to manufacture cells having a low electrochemical surface from the same standard electrodes, the anode and cathode are, for example, first folded in half to reduce their overall length by 50%. Other fold patterns may also be practiced according to the method of the present invention, thereby providing a wide range of possible electrochemical surface areas which are reduced compared to (a fraction of) that of the unfolded standard electrode. The electrodes thus folded by the method of the present invention, can then be configured and assembled into a cell stack. For example, an anode and a cathode, both folded according to the method of the present invention, are then combined with separator material of appropriately reduced size and configured into a cell stack of flat plate or jellyroll type design. Alternatively, an anode folded according to the present invention can be combined with a "standard" cathode, which has been made for a corresponding electrochemical surface area by a specialized manufacturing process. Likewise, a cathode folded according to the present invention can be combined with a "standard" anode, which has been made for a corresponding electrochemical surface area by a specialized manufacturing process. Electrode stacks of the high electrochemical surface, and of the low electrochemical surface are then used in subsequent manufacturing processes for assembling into finished electrochemical cells. The foregoing provides a method of configuring standard electrodes for use in cells of either a high electrochemical surface or a low electrochemical surface without appreciably increasing the cost of specialized manufacturing processes, or necessitating any substantial alterations in existing machinery involved in those processes, and yet maintaining a high degree manufacturability.

The foregoing and additional advantages and characterizing features of the present invention will become apparent from the detailed description herein together with the included drawings wherein:

BRIEF DESCRIPTION OF THE DRAWING FIGURES

DETAILED DESCRIPTION OF THE INVENTION

Figure 1A:
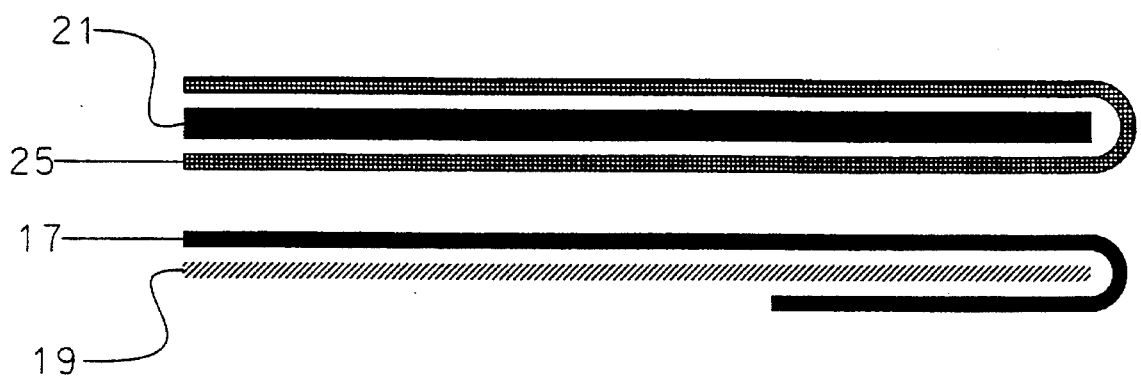
FIG. 1A is a diagrammatic view of the typical configuration of a standard electrode stack and separator which may be used, as for example, in a cell having a high electrochemical surface.

Typically, the electrode assembly of an electrochemical cell is a three piece laminate comprising an anode, a cathode, and porous, electrically non-conductive separator material encapsulating either or both of the electrodes. The three component laminate is then configured into a cell stack of flat plate design which can be utilized in a prismatic style of cell, or wound in a jellyroll type design for use typically in cylindrical cells. The anode structure 17, in FIG. 1A comprises a continuous elongated element or structure of anode active material which may be coated or compressed onto an anode conductor element 19 in the form of a thin metal screen. In one embodiment, because the method of the present invention involves the folding of the electrodes to achieve configuring a standard electrode having a high electrochemical surface to one having a low electrochemical surface, useful anode-active material preferably includes any malleable anode material such as alkali metals or a metal selected from the group consisting of Group IA, Group IIA, and Group IIIB, or alloys thereof. The anode conductor element 19 may comprise a screen composed of a conducting metal such as a metal selected from the group consisting of stainless steel, nickel, titanium, and aluminum. In the illustrative embodiments to follow, the anode active material comprises lithium, and the anode conductor element comprises nickel screen.

A cathode structure 21 comprises a continuous elongated element or structure of cathode active material which may be coated on an cathode current collector element. In continuing with this illustration of an embodiment, cathode active materials known in the art include, but are not limited to, a metal oxide, mixed metal oxides, or metal oxide bronze. The cathode current collector element serves to conduct the flow of electrons between the cathode active material and the cell terminals, and acts as a support matrix for the cathode active material. Exemplary cathode current collector elements include stainless steel, ferritic stainless steels, titanium, and other conducting highly alloyed metals. The cathode may further comprise binder and conductor materials. As noted previously, neither the battery type per se, nor the particular compositions of the electrodes, are the primary focus of the invention. Thus, it is recognized that anode active and cathode active materials can have various forms, and the materials listed above are for exemplary purposes only.

A separator means 25 is provided which acts to electrically insulate the anode from the cathode. The separator means comprises a material, known to those in the art, which is wettable by the cell electrolyte, yet sufficiently pourous to allow for electrolyte flow, and maintains physical and chemical integrity in the cell environment. Exemplary separator materials include polytetrafluoroethylene, non-woven glass, polypropylene, and polyethylene. The separator means, interposed between the two electrodes, typically encapsulates one of the electrodes which is generally the cathode, as shown in FIG. 1. One method for encasing cathode 21 includes providing a strip of separator material somewhat longer than cathode 21 and twice as wide. The separator strip 25 is folded along the long axis. Cathode 21 is then placed into the fold through the open end of the fold, and then the open end of separator 25 is bonded by heat sealing which melts the layers of the open end of separator 25 and allows the upper layer to bond with the lower layer.

The invention may be carried out in various ways, but one method of configuring an electrode from having an high electrochemical surface to a low electrochemical surface is illustrated by way of example in the accompanying FIG. 1. FIG. 1A is the typical configuration of a standard electrode stack comprising anode 17, cathode 21 and separator 25, which may be used, as for example, in a cell having a high electrochemical surface. Separator 25 is in the form of a strip of suitable separator material having a length of about twice that of either anode 17 or cathode 21, and in the present illustration is folded about cathode 21. Thus, separator 25 is folded at a location about midway between the ends thereof, and so as to be folded endwise of cathode 21 with the fold of separator 25 being adjacent one end of cathode 21. Alternatively, separator 25 could be folded about anode 17 in a similar manner.

Figure 1B:
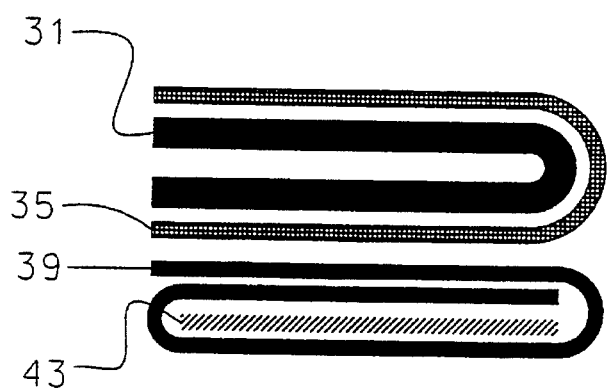
FIG. 1B is a diagrammatic view of the standard electrode stack depicted in FIG. 1A which has been folded according to the method of the present invention, and combined with separator material of appropriately reduced size, thereby resulting a configuration which may be used, for example, in a cell having a low electrochemical surface.

In accordance with the method of the present invention, before encapsulating an electrode with a separator, to configure electrodes having a low electrochemical surface from standard electrodes having a high electrochemical surface, the anode and cathode are first folded in half to reduce their overall length by 50%, the resultant folded electrodes being illustrated in FIG. 1B. As illustrated in FIG. 1B in view of FIG. 1A, cathode 21 is folded at a location about one half the distance between the ends thereof, thereby folding it upon itself, and in half, to reduce its electrochemical surface by 50%. The folded cathode, 31, is then encapsulated by separator material 35 of appropriately reduced size, as illustrated in FIG. 1B. In a manner as described previously, cathode 31 can be placed into folded separator 35 through the open end of the fold, and then the open end of separator 35 may be bonded by heat sealing which melts the layers of the open end of separator 35 and allows the upper layer to bond with the lower layer.

As illustrated in FIG. 1B in view of FIG. 1A, anode 17, before being coated or compressed onto anode screen 19, is folded at a location about one half the length thereof, thereby folding it upon itself, and in half, to reduce its electrochemical surface by 50%. As illustrated in FIG. 1B, although the fold of anode 17 results in folded anode 39 having about half the length of anode 17, relatively the same amount of anode active material is maintained in association with the cathode by folding standard anode 17 in a manner resulting in folded anode 39 having a double layer of anode active material in a face-to-face relation with folded cathode 31 wherein the folded anode 39 and folded cathode 31 have separator 35 positioned therebetween. Folded anode 39 is then coated or compressed onto anode screen 43 of appropriately reduced size, as illustrated in FIG. 1B, wherein anode screen 43 is inserted into a fold space such that a double layer of anode active material is positioned along the length of folded anode 39 that is placed in a face-to-face relation with folded cathode 31 and separator 35, and a single layer of anode active material is positioned along the opposite length thereof Thus, as illustrated in accompanying figures, standard electrodes 17 and 21, assembled into a cell stack of flat plate design or jellyroll type design useful to manufacture cells having a high electrochemical surface, can be configured according to the method of the present invention to result in folded electrodes 31 and 39, assembled in a cell stack of flat plate design or jellyroll type design useful to manufacture cells having a low electrochemical surface. The length of each leg in the fold and the number of folds, of course, will be determined by the length of the standard electrode and correspondingly, the desired electrochemical surface area; and the dimensions of the electrochemical casing in which the cell stack, comprising one or more folded electrodes, is to be inserted. Thus, other fold patterns may also be practiced according to the method of the present invention, thereby providing a wide range of possible electrochemical surface areas which are reduced compared to (a fraction of) that of the unfolded standard electrode from which it is configured. Although the illustrative example combines an anode and a cathode, each folded by the method of the present invention, in assembly into a cell stack, it is understood that a cell stack may also be assembled from a combination comprising an electrode folded according to the method of the present invention and a standard electrode which has been made for a corresponding electrochemical surface area by a specialized manufacturing process. As is evident from the aforementioned description, and the accompanying illustrations, both the separator and anode screen are of appropriately reduced sizes, when used with the folded electrodes configured according to the method of the present invention, so as to be cost-effective relative to these materials.

The following examples serve to illustrate the method of the present invention, and are not intended to limit the scope thereof.

EXAMPLE I

Figure 2:
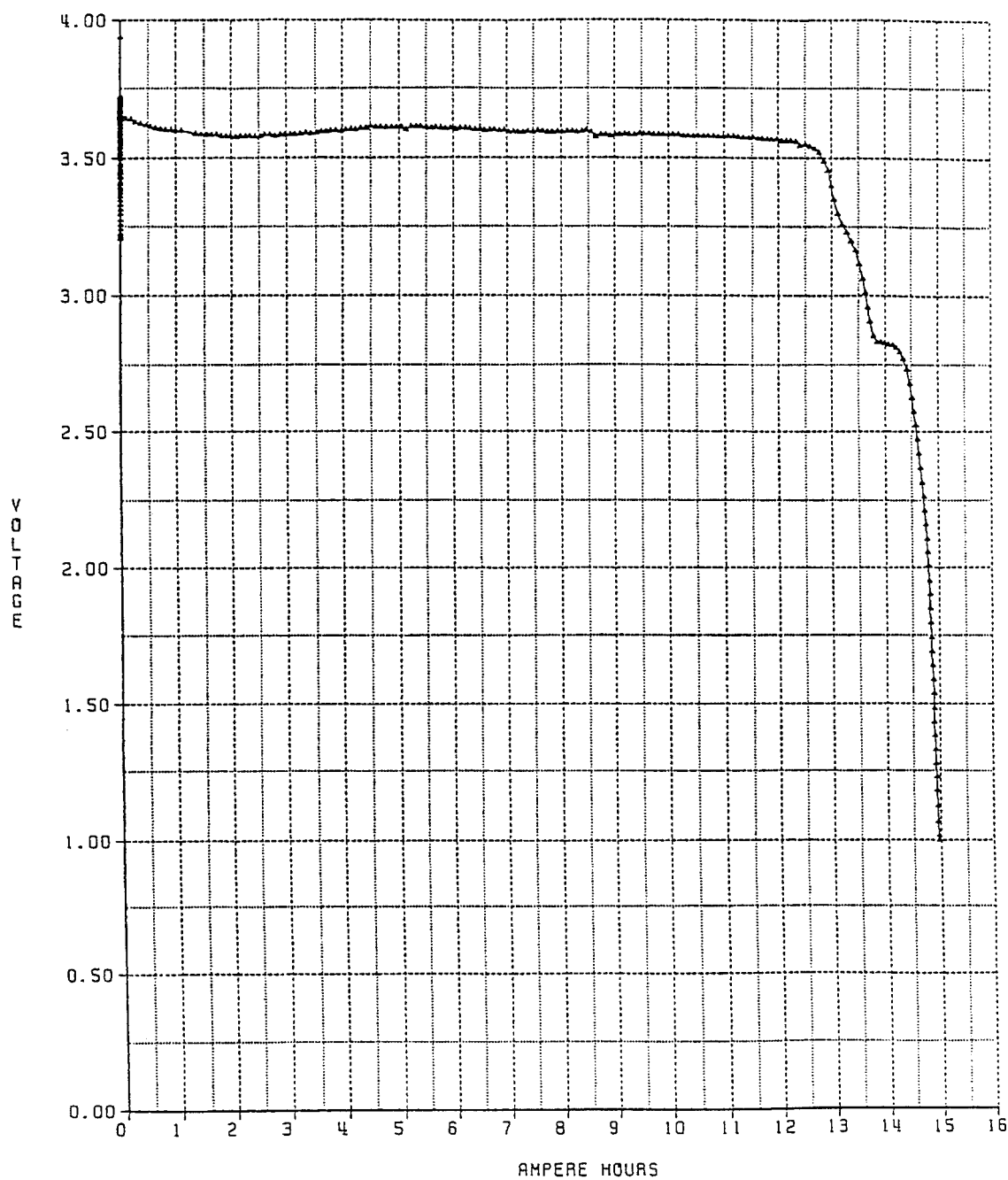
FIG. 2 is a graph showing the voltage discharge profile of a standard cell, containing a typical configuration of a standard electrode stack and separator as illustrated in FIG. 1A, under a 20Ω load.

Prototype cells were constructed to illustrate the method of the present invention. Each cell was constructed to include a lithium anode, a carbon cathode, and an ionic conductive electrolytic solution comprising a halogen dissolved in a non-aqueous solvent. In particular, this battery type, designated CSC, contains a lithium anode, a carbon cathode, and a solution of lithium tetrachlorogallate ($LiGaCl_4$) in a mixture of sulfuryl chloride ($SO_2Cl_2$, —$Cl_2$), and chlorine serving as depolarizer and electrolyte. The separator was comprised of non-woven glass. Each cell stack was assembled and manufactured into a cell approximately according to "D" size specifications. The lithium anode, of the standard configurations measured 29.6 cm in length, and 4.08 cm in width; and was pressed on an anode screen of 28.9 cm in length comprised of 304L stainless steel. The cathode, of the standard configuration, measured 27.3 cm in length, and 4.2 cm in width and was encapsulated in a separator of 35.6 cm in length. The cell stack was assembled into the cell, the electrolyte was added, and the cell sealed, using conventional methods. FIG. 2 is a graph of load voltage as a function of time, illustrating the discharge profile of this CSC "D" cell under a 20Ω load.

Figure 3:
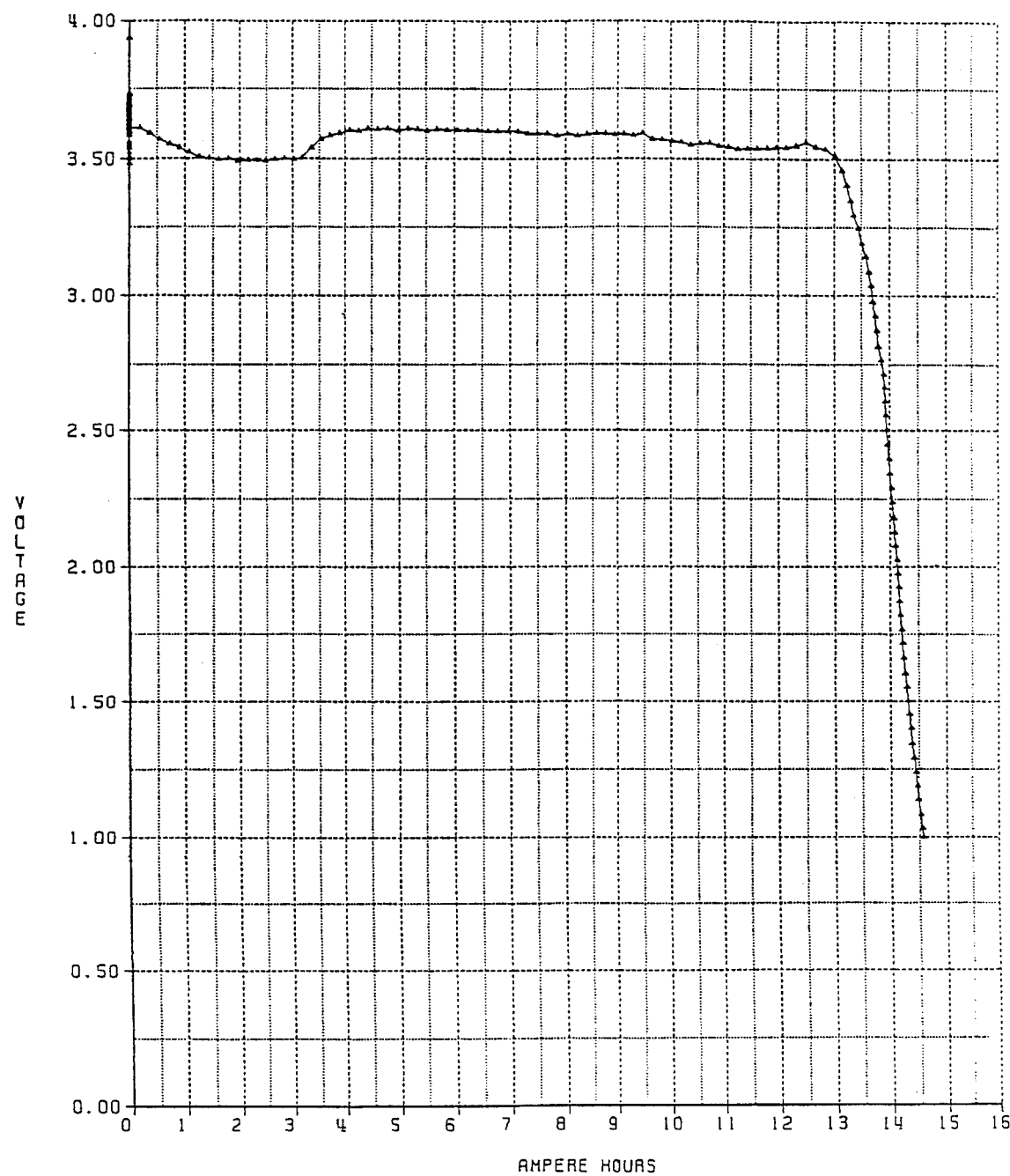
FIG. 3 is a graph showing the voltage discharge profile of a standard cell of the cell type depicted in FIG. 2, containing an electrode stack which has been folded, and combined with separator material of appropriately reduced size as illustrated in FIG. 1B, under a 20Ω load.

Using the method of the present invention, the anode and cathode of the standard configuration described in this embodiment, were configured so that the folded electrodes could then be used in a cell having a low electrochemical surface. According to the method of the present invention, the anode was first folded in half resulting in a folded anode of 140 cm in length, and 4.08 cm in width. The folded anode was then pressed on an anode screen of 13.0 cm in length comprised of 304L stainless steel. The cathode was first folded in half resulting in a folded cathode of 13.7 cm in length and 4.2 cm in width. The folded cathode was then encapsulated in a separator of 17.8 cm in length. The cell stack, containing the electrodes folded according to the present invention, was assembled and manufactured into a cell, as described above. FIG. 3 is a graph of load voltage as a function of time, illustrating the discharge profile of this CSC "D" cell containing the electrodes configured according to the method of the present invention, under a 20Ω load.

EXAMPLE 2

Figure 4:
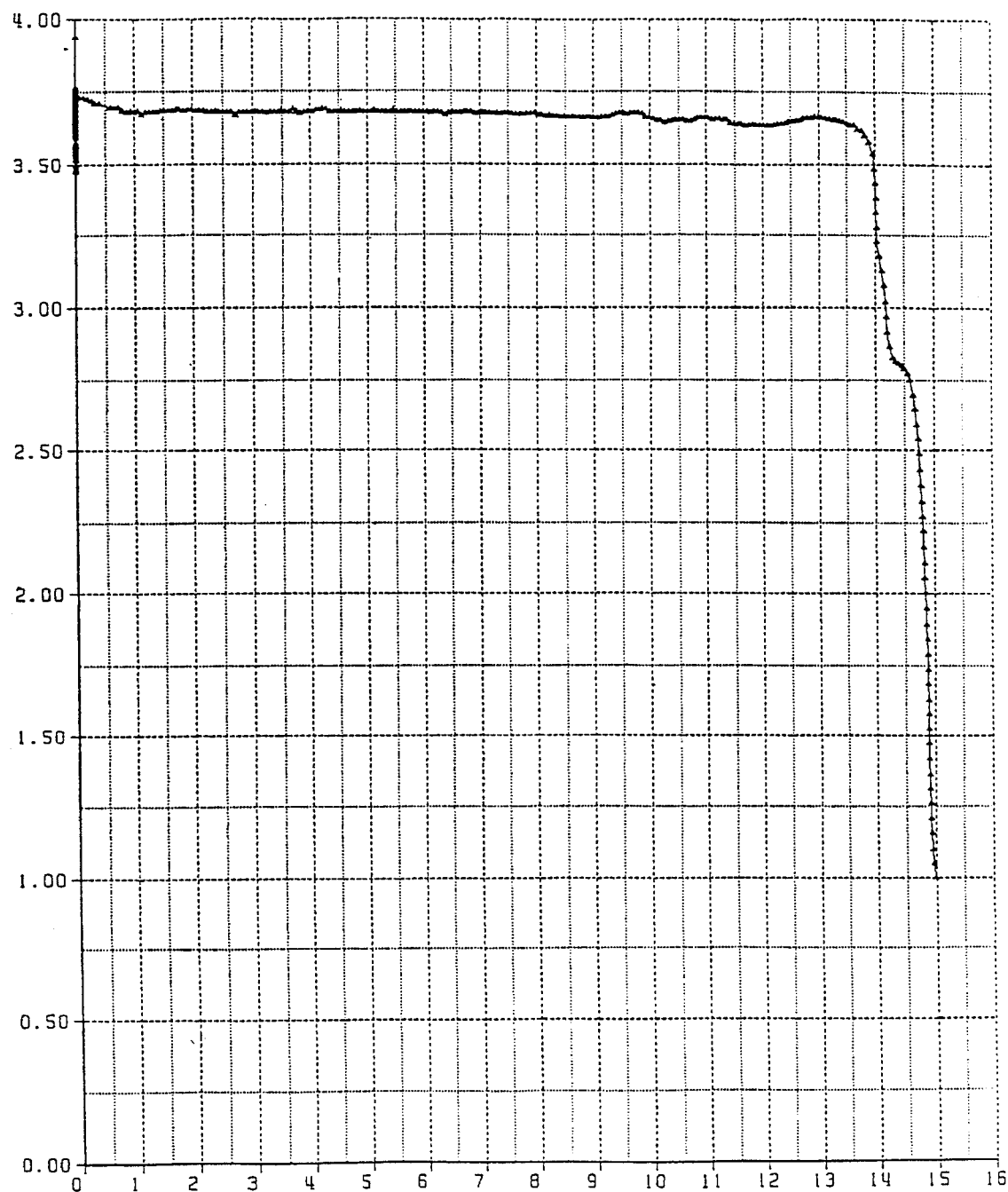
FIG. 4 is a graph showing the voltage discharge profile of a standard cell, containing a typical configuration of a standard electrode stack and separator as illustrated in FIG. 1A, under a 56Ω load.
Figure 5:
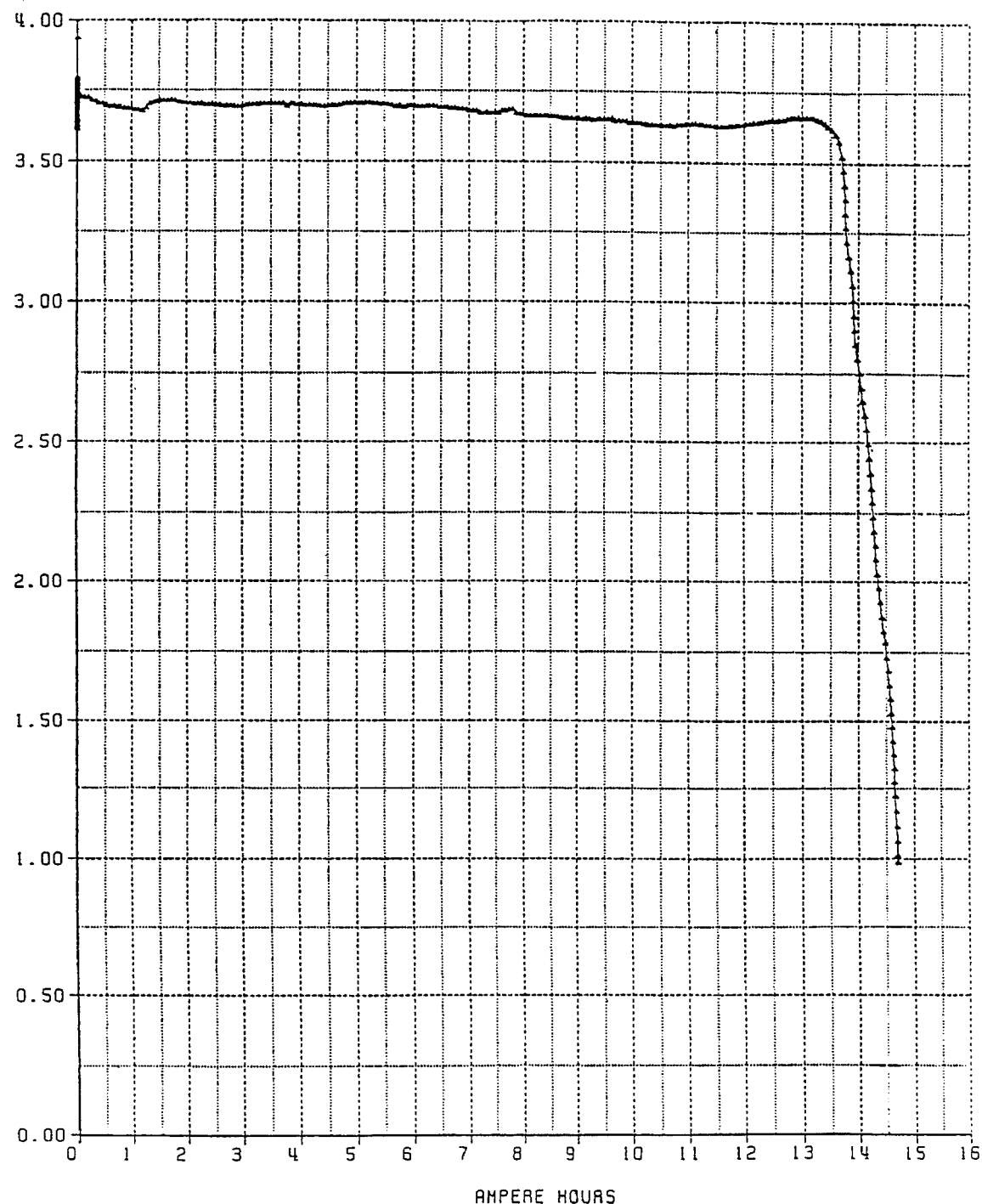
FIG. 5 is a graph showing the voltage discharge profile of a standard cell of the cell type depicted in FIG. 4, containing an electrode stack which has been folded, and combined with separator material of appropriately reduced size as illustrated in FIG. 1B, under a 56Ω load.

CSC "D" cells were constructed having a lithium anode, a carbon cathode, and a solution of lithium tetrachlorogallate ($LiGaCl_4$) in a mixture of sulfuryl chloride and chlorine ($SOCl_2$, —$Cl_2$), as described in Example 1. A cell prepared using the anode and the cathode in their standard electrode configurations was discharged under a 56Ω load, the discharge profile being illustrated in FIG. 4. The cell configured using the method of the present invention, so that the folded electrodes could then be used in a cell having a low electrochemical surface, was discharged under a 56Ω load. FIG. 5 is a graph of load voltage as a function of time, illustrating the discharge profile of this CSC "D" cell containing the electrodes configured according to the method of the present invention, under a 56Ω load.

Utilizing the method of this invention, it was found that cells containing the electrodes configured by this folding process were of comparable quality to cells containing the electrodes in standard configuration.

The above detailed description and examples are intended for purposes of illustrating the invention and are not to be construed as limiting.

What is claimed is:

1. A method of configuring an electrode having a low electrochemical surface area from a standard electrode having a high electrochemical surface area, said method comprising the steps of:

(a) folding a first standard electrode, comprising a cathode, at one or more locations between the ends thereof, thereby folding the cathode upon itself, resulting in a folded cathode having an electrochemical surface area reduced to a fraction of that of the unfolded first standard electrode from which it is configured;

(b) placing the cathode folded according to step (a) in a face-to-face relationship with an unfolded second standard electrode, comprising an anode having an electrochemical surface area corresponding to the size of the folded cathode, with a separator therebetween in assembling a cell stack useful in the manufacturing of an electrochemical cell.

2. The method of configuring an electrode according to claim 1 wherein the cathode is folded at a location about one half the distance between the ends thereof, thereby folding the cathode upon itself and in half, in reducing the electrochemical surface area of the first standard electrode by 50%.

3. The method of configuring an electrode according to claim 1, wherein the step of providing the folded cathode and the standard anode with a separator therebetween comprises encapsulating at least one of the said electrodes in separator material.

4. The method according to claim 3, wherein the step of providing a separator therebetween comprises encapsulating the folded cathode in separator material, and said separator used for the folded cathode is of reduced size when compared to the size of a separator which is used for a standard cathode from which the folded cathode is configured.

5. An electrochemical cell having a cell stack assembled with electrodes configured according to the method of claim 1.

6. An electrochemical cell having a cell stack assembled with electrodes configured according to the method of claim 3.

7. A method of configuring electrodes having a low electrochemical surface area from standard electrodes having a high electrochemical surface area, said method comprising the steps of:

(a) folding a first standard electrode, comprising a cathode, at one or more locations between the ends thereof, thereby folding the cathode upon itself, resulting in a folded cathode having an electrochemical surface area reduced to a fraction of that of the unfolded first standard electrode from which it is configured;

(b) folding a second standard electrode, comprising an anode, at one or more locations between the ends thereof, thereby folding the anode upon itself, resulting in a folded anode having an electrochemical surface area reduced to a fraction of that of the unfolded second standard electrode from which it is configured;

wherein the cathode folded according to step (a) and the anode folded according to step (b) are placed in a face-to-face relationship with a separator therebetween in assembling a cell stack useful in the manufacturing of an electrochemical cell.

8. The method of configuring electrodes according to claim 7 wherein the cathode is folded at a location about one half the distance between the ends thereof, thereby folding the cathode upon itself and in half, in reducing the electrochemical surface area of the cathode by 50%; and the anode is folded at a location about one half the distance between the ends thereof, thereby folding the anode upon itself and in half, in reducing the electrochemical surface area of the anode by 50%.

9. The method of configuring electrodes according to claim 7, wherein the step of providing the folded cathode and folded anode with a separator therebetween comprises encapsulating at least one of the folded electrodes in separator material, and said separator used for the folded electrode is of reduced size when compared to the size of a separator which is used for said standard electrode from which the folded electrode is configured.

10. The method of configuring electrodes according to claim 7, further comprising coating or compressing the folded anode onto an anode screen by first inserting said screen between the fold of the folded anode, wherein said anode screen used for the folded anode is of reduced size when compared to the size of an anode screen which is used for said unfolded second electrode from which the folded anode is configured.

11. The method according to claim 10, wherein the anode screen is inserted between the fold space of the folded anode so that a double layer of anode active material is positioned along the length of the folded anode placed in a face-to-face relationship with the folded cathode, and a single layer of anode active material is positioned along the opposite side thereof.

12. An electrochemical cell having a cell stack assembled with electrodes configured according to the method of claim 7.

13. A cell according to claim 12, wherein the separator provided between the folded cathode and folded anode comprises separator material that encapsulates at least one of the folded electrodes.

14. A cell according to claim 12, wherein the folded anode is coated or compressed onto an anode screen.

15. A cell according to claim 14, wherein the anode screen is inserted between the fold space of the folded anode so that a double layer of anode active material is positioned along the length of the folded anode placed in a face-to-face relationship with the folded cathode, and a single layer of anode active material is positioned along the opposite side thereof.

16. A method of configuring an electrode having a low electrochemical surface area from a standard electrode having a high electrochemical surface area, said method comprising the steps of:

(a) folding a first standard electrode, comprising an anode, at one or more locations between the ends thereof, thereby folding the anode upon itself, resulting in a folded anode having an electrochemical surface area reduced to a fraction of that of the unfolded first standard electrode from which it is configured;

(b) placing the anode folded according to step (a) in a face-to-face relationship with an unfolded second standard electrode, comprising an cathode having a electrochemical surface area corresponding to the size of the folded anode, with a separator therebetween in assembling a cell stack useful in the manufacturing of an electrochemical cell.

17. The method of configuring an electrode according to claim 16, wherein the step of providing the folded anode and the standard cathode with a separator therebetween comprises encapsulating at least one of the said electrodes in separator material.

18. The method according to claim 4, wherein the step of providing a separator therebetween comprises encapsulating the folded anode in separator material, and said separator used for the folded anode is of reduced size when compared to the size of a separator which is used for a standard anode from which the folded anoded is configured.

19. The method according to claim 17, further comprising coating or compressing the folded anode onto an anode screen by first inserting said screen between the fold of the folded anode, wherein said anode screen used for the folded anode is of reduced size when compared to the size of an anode screen which is used for a standard anode from which the folded anode is configured.

20. The method according to claim 19, wherein the anode screen is inserted between the fold space of the folded anode so that a double layer of anode active material is positioned along the length of the folded anode placed in a face-to-face relationship with the standard cathode, and a single layer of anode active material is positioned along the opposite side thereof.

21. An electrochemical cell having a cell stack assembled with electrodes configured according to the method of claim 17.

22. An electrochemical cell having a cell stack assembled with electrodes configured according to the method of claim 19.

23. An electrochemical cell having a cell stack assembled with electrodes configured according to the method of claim 20.

24. The method of configuring an electrode according to claim 16 wherein the anode is folded at a location about one half the distance between the ends thereof, thereby folding the anode upon itself and in half, in reducing the electrochemical surface area of the first standard electrode by 50%.

25. An electrochemical cell having a cell stack assembled with electrodes configured according to the method of claim 16.

* * * * *

UNITED STATES PATENT AND TRADEMARK OFFICE
CERTIFICATE OF CORRECTION

PATENT NO. : 5,468,569
DATED : November 21, 1995
INVENTOR(S) : Michael F. Pyszczek; Esther S. Takeuchi and Mark J. Kane It is certified that error appears in the above-identified patent and that said Letters Patent is hereby corrected as shown below:

Col. 8, line 41:
In claim 18 reciting "claim 4" should read --claim 17--

Signed and Sealed this

Second Day of April, 1996

Attest:

BRUCE LEHMAN

Attesting Officer   Commissioner of Patents and Trademarks